United States Patent
Inoue

(10) Patent No.: US 11,671,548 B2
(45) Date of Patent: Jun. 6, 2023

(54) IMAGE PROCESSING APPARATUS, METHOD, AND PRODUCT FOR CONVERTING COLOR DATA OF OBJECTS INTO GRAY DATA BASED ON POSITIONS OF OBJECTS FOR IMPROVED DISCRIMINABILITY

(71) Applicant: CANON KABUSHIKI KAISHA, Tokyo (JP)

(72) Inventor: Takuya Inoue, Ibaraki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/836,148

(22) Filed: Jun. 9, 2022

(65) Prior Publication Data
US 2023/0007144 A1    Jan. 5, 2023

(30) Foreign Application Priority Data

Jun. 30, 2021    (JP) .............................. JP2021-109415

(51) Int. Cl.
*H04N 1/40*      (2006.01)
*G06K 15/02*     (2006.01)
(Continued)

(52) U.S. Cl.
CPC ..... *H04N 1/40012* (2013.01); *G06K 15/1822* (2013.01); *G06K 15/1849* (2013.01); *H04N 1/00005* (2013.01); *H04N 1/00023* (2013.01); *H04N 1/00039* (2013.01); *H04N 1/00082* (2013.01); *H04N 1/40062* (2013.01); *H04N 1/6072* (2013.01)

(58) Field of Classification Search
CPC .......... H04N 1/40012; H04N 1/40062; H04N 1/6072; H04N 1/407; H04N 1/4072; H04N 1/409; H04N 1/4092
See application file for complete search history.

(56) References Cited

U.S. PATENT DOCUMENTS 8,462,384 B2 *   6/2013   Christie ............. H04N 1/40012
                                                        358/1.9
10,929,727 B2    2/2021   Inoue
(Continued)

FOREIGN PATENT DOCUMENTS

JP    2002262108 A  *  9/2002
JP    2010186298 A     8/2010
(Continued)

*Primary Examiner* — Scott A Rogers
(74) *Attorney, Agent, or Firm* — Rossi, Kimms & McDowell LLP

(57) ABSTRACT

An image processing apparatus for converting color data into gray data extracts an object included in the color data in a page, and determines, based on color information and position information on a first object and a second object extracted, whether at least one of the first object and the second object is to be a target of conversion of a color value of the color data into a gray value with improved discriminability. The image processing apparatus controls to convert the color value of the object into a gray value by a conversion targeting all color values, or into a gray value with the improved discriminability, based on the determination whether or not to be the target of conversion.

17 Claims, 10 Drawing Sheets

(51) Int. Cl.
*H04N 1/00* (2006.01)
*H04N 1/60* (2006.01)

(56) References Cited

U.S. PATENT DOCUMENTS

| | | | |
|---|---|---|---|
| 11,375,081 B2* | 6/2022 | Sugahara | H04N 1/40012 |
| 2018/0270391 A1* | 9/2018 | Sugahara | H04N 1/40012 |
| 2022/0263973 A1* | 8/2022 | Eguchi | H04N 1/4092 |

FOREIGN PATENT DOCUMENTS

| | | | |
|---|---|---|---|
| JP | 2015173419 A | * | 10/2015 |
| JP | 2017038242 A | | 2/2017 |
| JP | 2020049939 A | | 4/2020 |

* cited by examiner

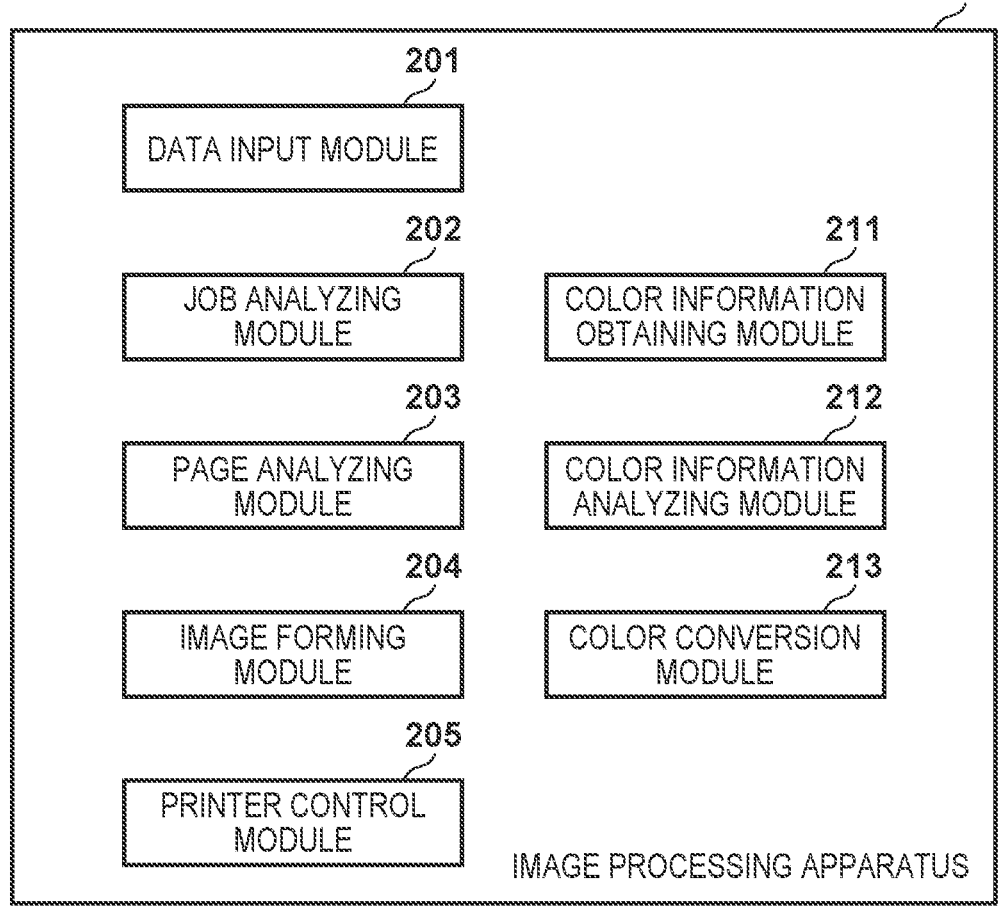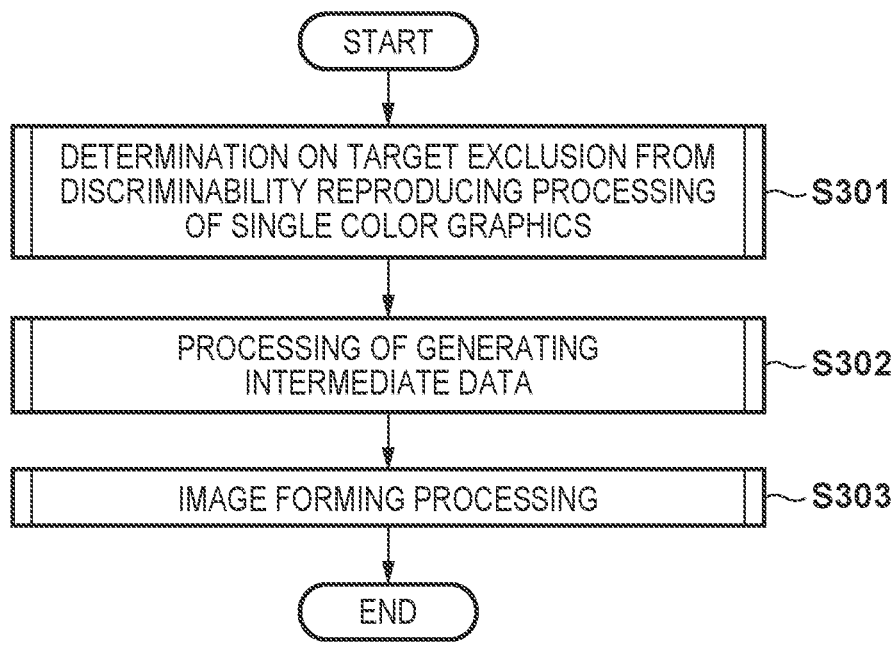

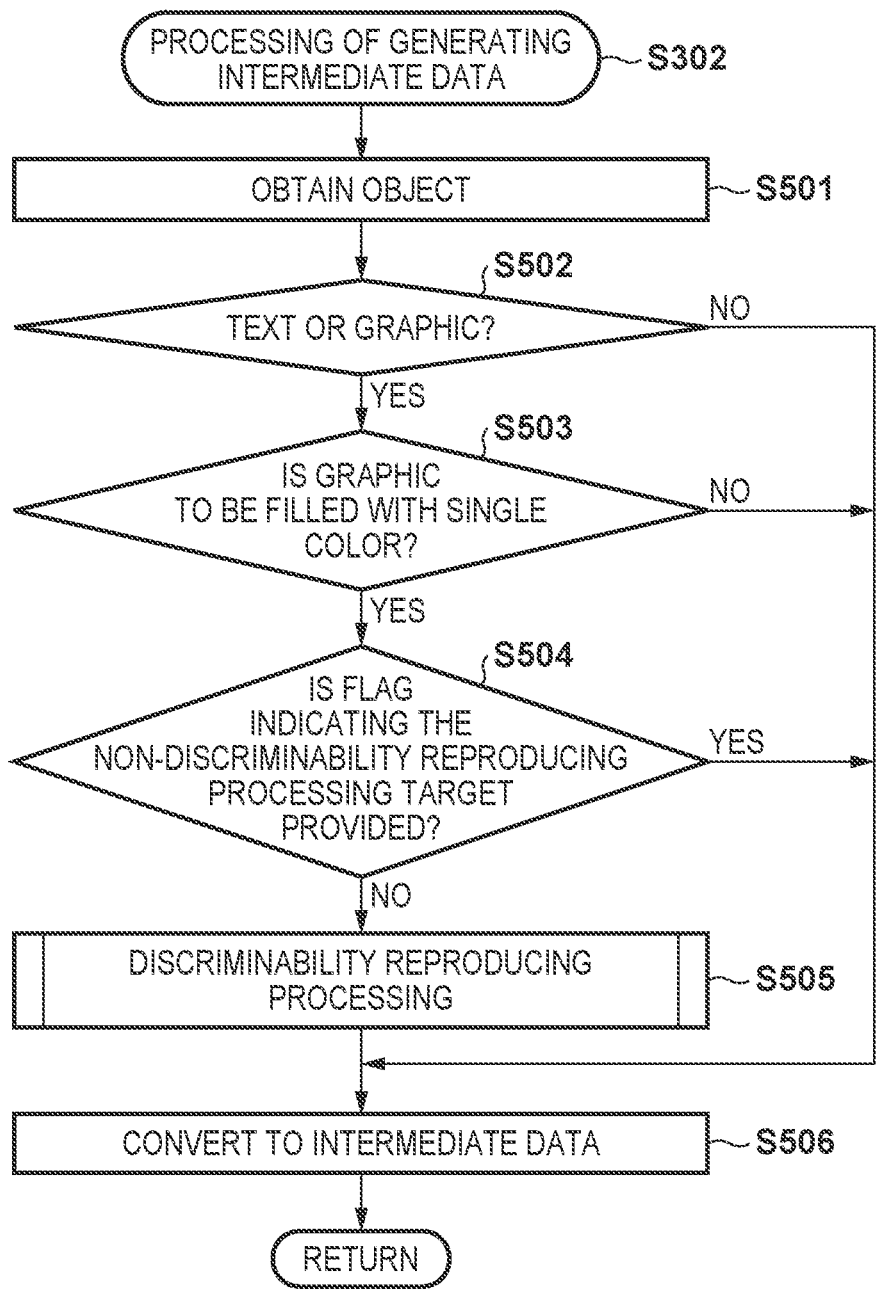

| ID | COLOR VALUE BEFORE CONVERSION | COLOR VALUE AFTER CONVERSION |
|---|---|---|
| 1 | R:255, G:0, B:0 | R:102, G:102, B:102 |
| 2 | R:0, G:255, B:0 | R:51, G:51, B:51 |
| 3 | R:0, G:0, B:255 | R:153, G:153, B:153 |

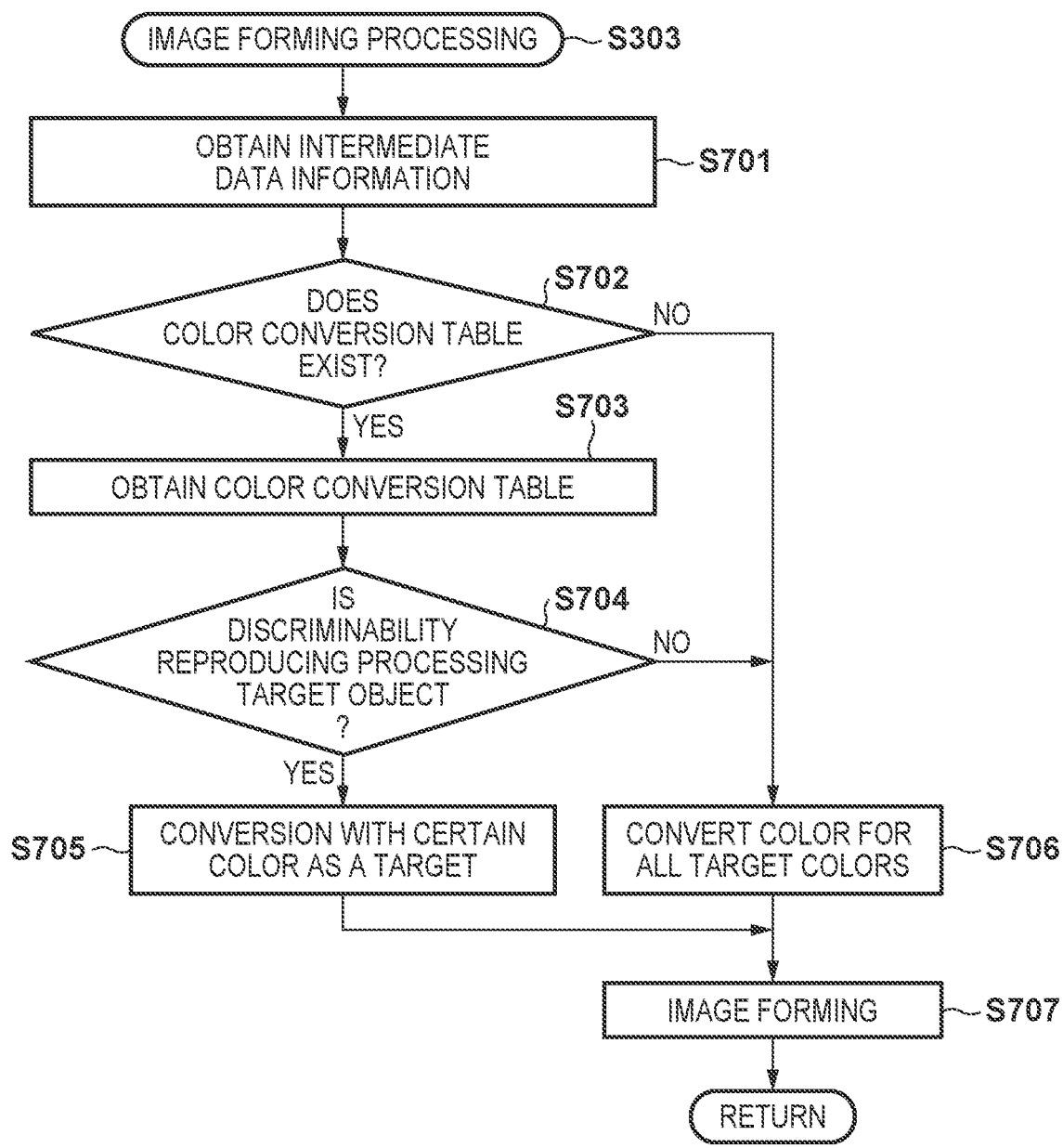

IMAGE PROCESSING APPARATUS, METHOD, AND PRODUCT FOR CONVERTING COLOR DATA OF OBJECTS INTO GRAY DATA BASED ON POSITIONS OF OBJECTS FOR IMPROVED DISCRIMINABILITY

BACKGROUND OF THE INVENTION

Field of the Invention

The present invention relates to an image processing apparatus, a method of controlling the same, and a storage medium.

Description of the Related Art

When a color image, expressed in an RGB format or the like, is printed in a grayscale format using a printing apparatus, it is a common practice to perform the printing with image data in which input RGB values are converted into gray values using a uniform conversion scheme targeting all the color values (a conversion scheme with which all the color values are converted under the same rule, such as NTSC conversion, for example). Such color conversion targeting all the colors (hereinafter, color conversion for all target colors) is effective for printing of a color image requiring tonality. The NTSC conversion scheme is a conversion scheme for converting RGB values into gray values using the following Formula (1).

$$\text{Gray value} = 0.30 \times R + 0.59 \times G + 0.11 \times B \quad \text{Formula (1)}$$

However, with the color conversion for all target colors, color information is lost in a process of converting RGB (three channels) into gray (one channel). Thus, the color conversion for all target colors converting a plurality of colors expressed by different RGB values (colors) into the same (or similar) gray value(s), may cause a difference between the plurality of colors being unidentifiable. In particular, in a case of a pie chart or the like with images rendered to have two colors partially overlapping or being in contact with each other, the boundary between the two colors is lost. When characters and the like on a figure are converted into close gray values, visibility of the characters is compromised. Thus, there has been a problem in that when a monochrome image thus generated is printed, the discriminability making the original color difference identifiable is compromised from that in the case of color printing.

In Japanese Patent Laid-Open No. 2020-49939, Page Description Language (PDL) data is analyzed, and the number of colors and color values are obtained for text and graphics rendering in a page. A density difference is provided to a monochrome image based on the number of colors and the color values. Thus, information can be prevented from being lost even in a case of monochrome output, whereby discriminability can be improved with densities achieving high visibility.

Unfortunately, this processing of reproduction with improved discriminability in reproduction (hereinafter, discriminability reproducing processing) may lead to an undesirable result, if all the text and graphics in the page are targeted. For example, when a large number of adjacent graphics with similar colors are targeted, the number of colors is large at a portion of those graphics, resulting in a failure to provide the portion that actually requires the improvement in discriminability, with an appropriate density difference. For the rendering of gradation expression among the graphics, a density difference is not desirable. Data transmitted for gradation rendering for such gradation expression can be determined to be gradation data. Such data is mainly configured with fine single color graphics, images, and the like. Thus, providing a density difference with the gradation expression configured with the fine graphics being the target leads to a density step provided in an image reproduced, resulting in compromised appearance. Thus, graphics requiring no improvement in discriminability are desirably excluded from the target of the discriminability reproducing processing.

Japanese Patent Laid-Open No. 2010-186298 describes a technique of detecting gradation configured by single color graphics, images, and the like. With this gradation detection technique employed, only the data for gradation expression can be excluded from the target of the discriminability reproducing processing.

Still, image data for the gradation expression is not the only data that is desired to be excluded from the target of the discriminability reproducing processing. For example, application of the discriminability reproducing processing described above may lead to a density step provided in a reproduced image, resulting in compromised appearance, not only in the case of the gradation expression object, but also in a case of single color graphic object rendering.

SUMMARY OF THE INVENTION

An aspect of the present invention is to eliminate the above-mentioned problem with conventional technology.

A feature of the present invention is to provide a technique of excluding graphics requiring no processing of improving discriminability from the target of the discriminability reproducing processing, so that a reproduced image of such graphics can be prevented from having compromised appearance.

According to a first aspect of the present invention, there is provided an image processing apparatus for converting color data into gray data, the image processing apparatus comprising: one or more processors and one or more memories being configured to: extract an object included in the color data in a page; determine, based on color information and position information on a first object and a second object extracted, whether at least one of the first object and the second object is to be a target of conversion of a color value of the color data into a gray value with improved discriminability; and control to convert, based on the determining, the color value of the object into a gray value by a conversion targeting all color values, or into a gray value with the improved discriminability.

According to a second aspect of the present invention, there is provided an image processing apparatus for converting color data into gray data, the image processing apparatus comprising: one or more processors and one or more memories being configured to: convert a plurality of color values of the color data respectively into gray values different from each other by a predetermined value or more; convert color values of the color data into gray values based on a predetermined formula; identify a first graphic object and a second graphic object that are adjacent to each other in a page with a density difference between the first graphic object and the second graphic object being smaller than a threshold, and have different colors; and, for the first graphic object and the second graphic object identified, perform the conversion into the gray values based on the predetermined formula, without performing the conversion into the gray values different from each other by the predetermined value or more.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a functional block diagram for describing a functional configuration of software modules of an image processing apparatus according to the first embodiment.

FIG. 3 is a flowchart for describing an overall flow from analysis on print data on a page to image forming, performed by the image processing apparatus according to the first embodiment.

FIG. 5 is a flowchart for describing processing of generating intermediate data in step S302 in FIG. 3.

FIG. 7 is a flowchart for describing image forming processing in step S303 in FIG. 3.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Further, in the accompanying drawings, identical or similar components are denoted by identical reference signs, and redundant description will be omitted First Embodiment A first embodiment of the present invention is described below with reference to the drawings. In the first embodiment, discriminability reproducing processing for reproduction with improved discriminability through density adjustment includes determining whether continuous graphics are to be a discriminability reproducing processing target, and switching whether to execute the discriminability reproducing processing on the graphics.

Figure 1:
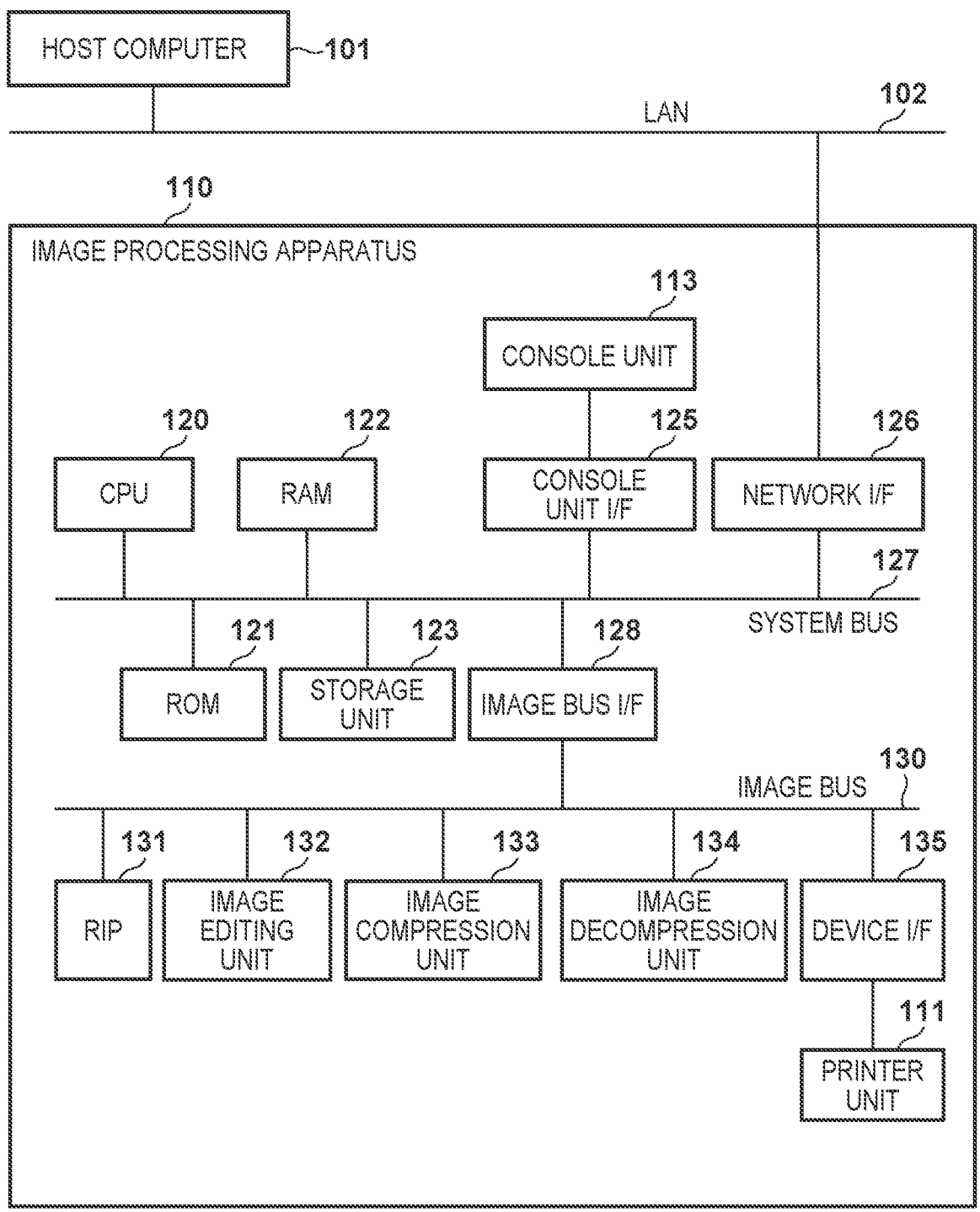
FIG. 1 is a diagram for describing a configuration example of a printing system according to a first embodiment of the present invention.

FIG. 1 is a diagram for describing a configuration example of a printing system according to the first embodiment of the present invention.

In this printing system, a host computer 101 and an image processing apparatus 110 are connected to each other via a LAN 102. A user generates, using the host computer 101, PDL data indicating information on a page to be printed, and transmits the PDL data from the host computer 101 to the image processing apparatus 110 via the LAN 102. The image processing apparatus 110 according to the first embodiment may be a printer that is any of a Multi Function Printer (MFP) and a Single Function Printer (SFP). The image processing apparatus 110 may be a printer other than the MFP or the SFP, and may be an apparatus that displays and outputs an image.

Next, a hardware configuration example of the image processing apparatus 110 according to the first embodiment will be described.

The image processing apparatus 110 includes, for example, a printer unit 111 that is an image output device. The image processing apparatus 110 obtains PDL data (print data described in a page description language) from the host computer 101 via the LAN 102.

The printer unit 111 is connected to a device I/F 135 and outputs (prints) an image on a sheet (paper) based on image data generated by a CPU 120. The CPU 120 is a central processing unit for controlling (each part of) the entire image processing apparatus 110. A RAM 122 provides a work memory for the CPU 120 to operate. The RAM 122 also provides a memory area for temporarily storing the obtained PDL data, intermediate data generated for image forming processing, a work area that is a working area used for performing rendering processing, and input image data. A ROM 121 is, for example, a boot ROM, and stores a boot program and the like for the apparatus. A storage unit 123 includes, for example, a hard disk drive, and stores system software for various types of processing, the obtained PDL data, and the like.

A console unit interface(I/F) 125 is an interface unit for a console unit 113 including a component such as a display unit for displaying various menus, information on print data instructed to be printed, and the like, and outputs screen data to the console unit 113. The console unit I/F 125 transmits information, input by the user using the console unit 113, to the CPU 120. A network I/F 126 exchanges information with an external apparatus (the host computer 101, for example) via the LAN 102. The CPU 120, the ROM 121, the RAM 122, the storage unit 123, the console unit I/F 125, and the network I/F 126 are connected to a system bus 127.

An image bus I/F 128 is an interface for connecting the system bus 127 with an image bus 130 for high-speed image data transfer, and functions as a bus bridge for converting a data structure. To the image bus 130, a raster image processor (RIP) 131, an image editing unit 132, an image compression unit 133, an image decompression unit 134, and a device I/F 135 are connected. Although these are hardware controlled by the CPU 120, a configuration in which these are controlled by a sub processor that can execute a program including a command different from that of the CPU 120. The RIP 131 analyzes the PDL data and the intermediate data (display list, DL) based on an instruction from the CPU 120, and rasterizes that data into image data in a raster format. The image editing unit 132 performs pixel-unit image editing such as color space conversion or contour correction, on the image data rasterized by the RIP 131. The image compression unit 133 compresses the image data obtained by the image rasterizing by the RIP 131, and stores the compressed image data in the RAM 122 through the image bus I/F 128. The image decompression unit 134 decompresses the compressed image data stored in the storage unit 123 or the RAM 122, and transmits the decompressed image data to the RIP 131 or the device I/F 135 through the image bus 130, in accordance with print processing. When box save is designated by the user, the image compression unit 133 and the image decompression unit 134 are used for storing in the storage unit 123, the image data in the raster format after the rasterizing by the RIP 131, and performing printing in accordance with an instruction from the user. When the rasterizing processing performed by the RIP 131 is earlier than the print processing by the printer unit 111, the image compression unit 133 and the image decompression unit 134 may be used for temporarily storing the rasterized image data in the storage unit 123. The device I/F 135 is an interface for transmitting data to the printer unit 111.

FIG. 2 is a functional block diagram for describing a functional configuration of software modules of the image processing apparatus 110 according to the first embodiment. Functions of these modules are implemented by the CPU 120 executing the program deployed onto the RAM 122 from the ROM 121 or the storage unit 123.

A data input module 201 receives print data from the host computer 101 via the network I/F 126 and the LAN 102. A job analyzing module 202 obtains settings for performing density adjustment and discriminability reproducing processing from the print data and analyzes the settings, or obtains the settings from a setting value set in advance if the settings fail to be obtained from the print data. More specifically, print setting information such as the Page Description Language (PDL) and Job Definition Format (JDF) included in the print data is obtained and analyzed. In the first embodiment, only a case where the discriminability reproducing processing is set will be described. A page analyzing module 203 analyzes information on each page. Specifically, the page description language included in the print data is obtained, and rendering commands included in each page are analyzed to generate the intermediate data. An image forming module 204 controls the RIP 131, the image editing unit 132, the image compression unit 133, and the image decompression unit 134. A printer control module 205 controls the device I/F 135 and the printer unit 111.

A color information obtaining module 211 obtains settings, related to color processing, included in the print data. Thus, the settings include a gamma correction value and designation of an ICC profile used, in addition to the settings for performing the density adjustment and the discriminability reproducing processing, but a description on these will be omitted in the first embodiment. A color information analyzing module 212 analyzes information on a rendering color and an object (graphic object) from rendering commands for each page analyzed by the page analyzing module 203. Finally, a color conversion module 213 performs conversion to gray data (monochrome data), based on the result of the analysis by the color information analyzing module 212.

Although the configuration of the software module in the first embodiment is as described above, a configuration in which each module includes a submodule may also be employed as a matter of course. Processing from data input to output to the printer unit 111 according to the first embodiment will be described below with reference to the following flowcharts.

FIG. 3 is a flowchart for describing an overall flow from analysis on print data on a page to image forming, performed by the image processing apparatus 110 according to the first embodiment. Note that the processing illustrated in this flowchart is implemented by the CPU 120 executing the program deployed onto the RAM 122.

In step S301, the CPU 120 functions as the page analyzing module 203 to analyze the print data, and obtain information on an object included therein. The CPU 120 functions as the color information analyzing module 212 to determine whether single color graphics to be excluded from the target of the discriminability reproducing processing are included in graphics designated to be filled with single color (hereinafter, referred to as single color graphics). Details of this processing will be described later with reference to the flowcharts of FIGS. 4A and 4B.

Next, the processing proceeds to step S302, and the CPU 120 functions as the page analyzing module 203 and the color information analyzing module 212 to receive the object that has been determined to be excluded from the target of the discriminability reproduction or not, and generate intermediate data on the object. In the processing of generating the intermediate data, processing (generation of a color conversion table) of reproducing with improved discriminability is performed on the object that is the discriminability reproducing processing target. By performing this discriminability reproducing processing (generation of the color conversion table), when an image of the object that is the discriminability reproducing processing target is formed, a grayscale image can be output with improved discriminability by adjusting the density thereof. Details of processing of generating intermediate data on a page for which the discriminability reproducing processing is performed will be described below with reference to a flowchart in FIG. 5. Note that this discriminability reproducing processing is, for example, processing as described in Japanese Patent Laid-Open No. 2020-49939, but the present invention is not limited to such processing.

Next, the processing proceeds to step S303, where the CPU 120 functions as the image forming module 204 to, while using the RIP 131, receive the intermediate data and perform image forming processing. Here, grayscale conversion with improved discriminability is performed, with the original color indicated by a density difference, by using the color conversion table for the discriminability reproducing processing target object. On the other hand, color conversion for all target colors is performed on an object excluded from the target of discriminability reproducing processing.

In this manner, an image involving a risk of having discriminability compromised when converted into a grayscale image can be formed as a converted grayscale image provided with the discriminability reproducing processing. Furthermore, a color image involving a risk of a compromised gray image when performed by the discriminability reproducing processing is excluded from the target of the discriminability reproducing processing, whereby the gray image can be prevented from being compromised. Details of the image forming processing will be described later with reference to a flowchart in FIG. 7.

Figure 4A:
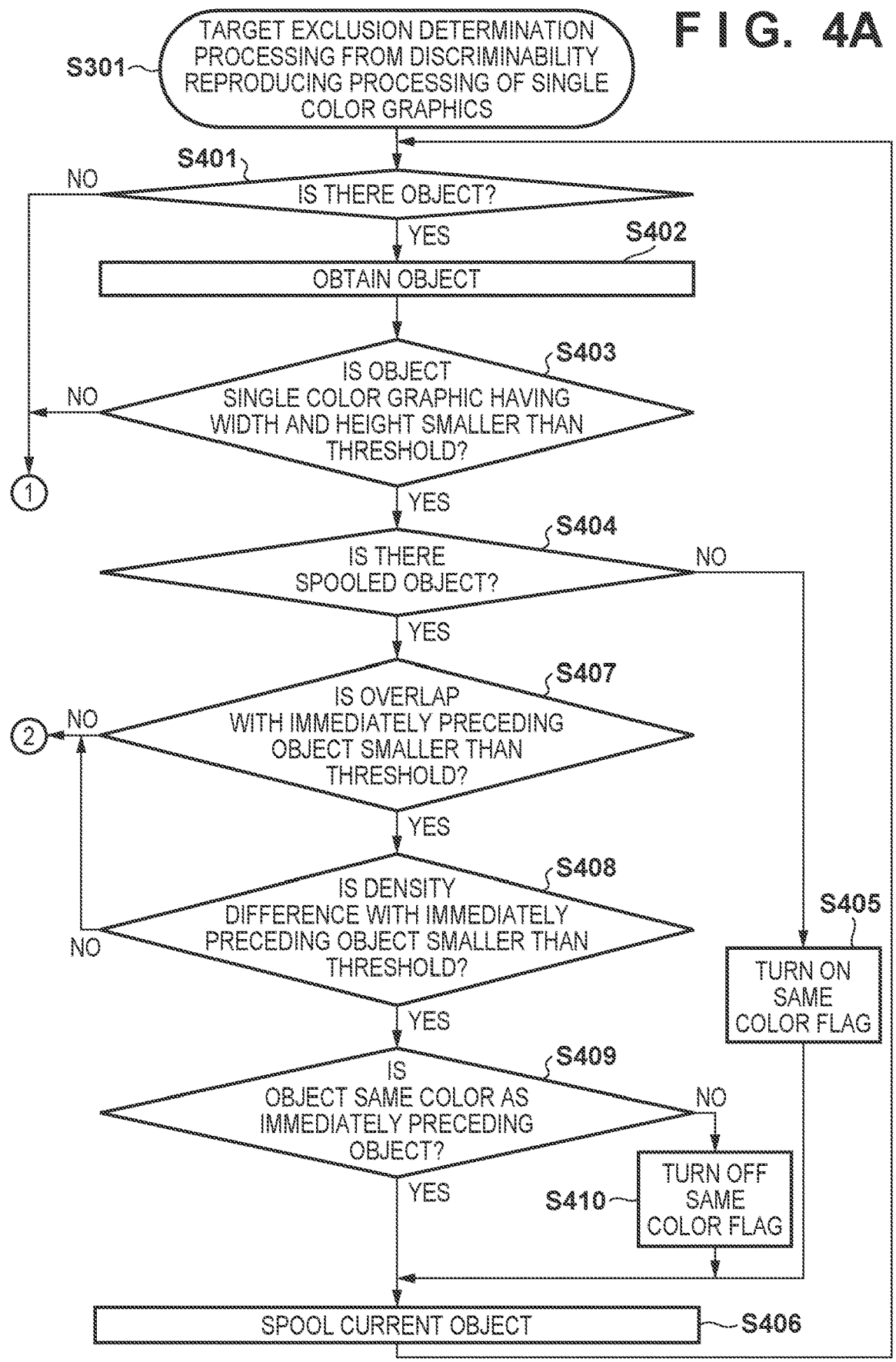
FIGS. 4A and 4B are flowcharts for describing processing for determining whether graphics are single color graphic to be a target of discriminability reproducing processing in step S301 in FIG. 3.
Figure 4B:
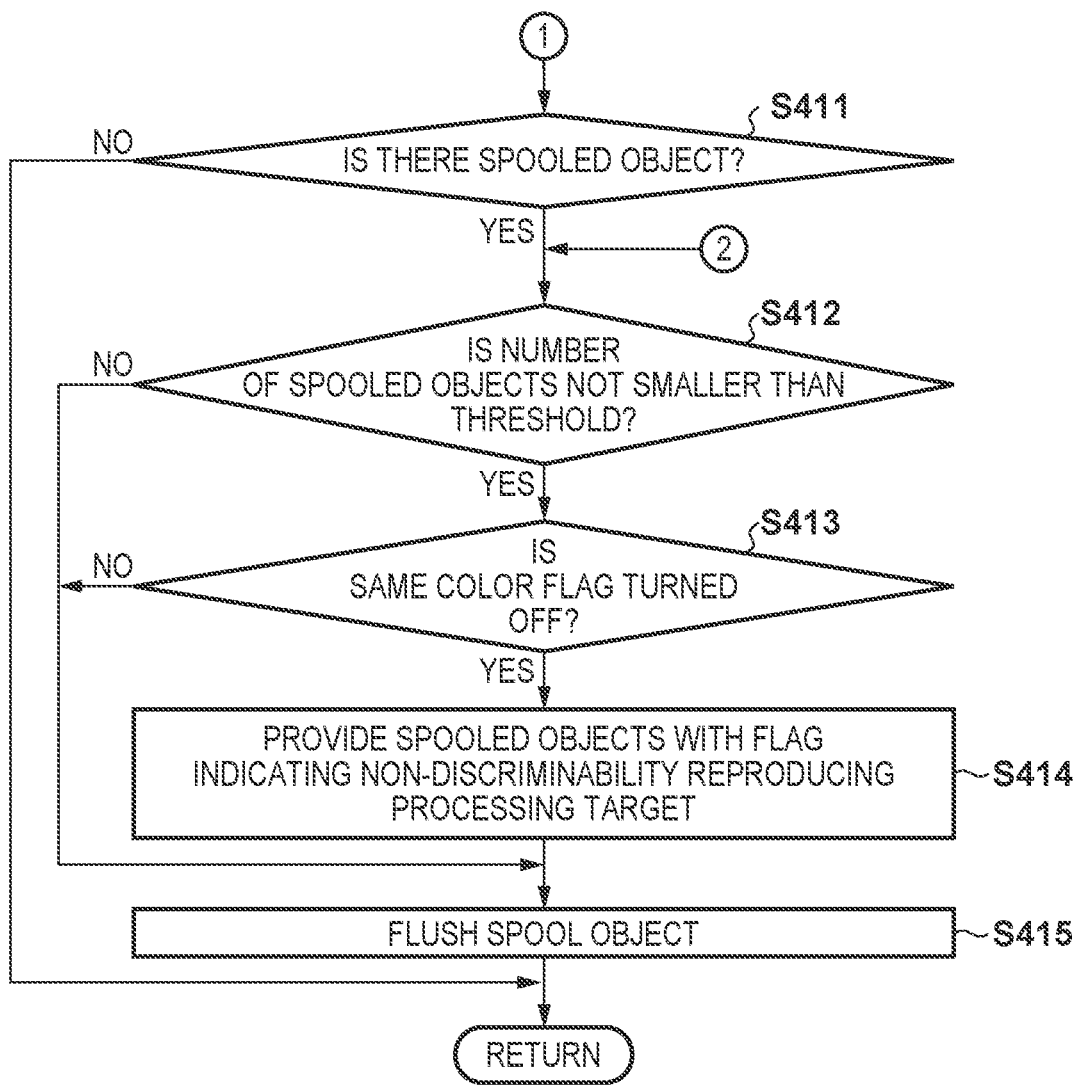

FIGS. 4A and 4B are flowcharts for describing processing for determining whether graphics are single color graphics to be the target of the discriminability reproducing processing in step S301 in FIG. 3. The processing described with reference to FIGS. 4A and 4B needs to be performed before intermediate data generation processing (step S302) described with reference to FIG. 5.

First of all, in step S401, the CPU 120 functions as the color information analyzing module 212 to determine whether there is an object to be read. When there is such an object, the processing proceeds to step S402. When there is no such object, the processing proceeds to step S411. In step S402, the CPU 120 extracts and obtains the object. Next, the processing proceeds to step S403, and the CPU 120 determines whether the object is a single color graphic having a width and height smaller than a threshold (smaller than a predetermined value), based on position information and color information on the object obtained. When the object is a single color graphic having a width and height smaller than the threshold, the processing proceeds to step S404. Otherwise, the processing proceeds to step S411.

This is because an object having a width and height not smaller than the threshold is the discriminability reproducing processing target object, that is, not to be excluded from the target of discriminability reproducing processing.

In step S404, the CPU 120 determines whether there is a spooled object. When there is no spooled object, the processing proceeds to step S405. When there is a spooled object, the processing proceeds to step S407. In step S405, the CPU 120 turns on a same color flag to determine whether objects to be spooled all have the same color, and the processing proceeds to step S406. In step S406, the CPU 120 spools the currently obtained object. Then, the processing proceeds to step S401 to obtain the next object. And thus, a state is achieved where an object satisfying the first condition is spooled, and the same color flag is on.

On the other hand, in step S407, because a single color object satisfying the condition is successfully detected in a state where there are objects spooled though step S401 to step S404, the CPU 120 determines whether an overlap with the immediately preceding object is smaller than a threshold. When the overlap is smaller than the threshold, the processing proceeds to step S408. Otherwise, the processing proceeds to step S412. This is because an object with the overlap with the immediately preceding object not smaller than the threshold is the discriminability reproducing processing target object, that is, not to be excluded from the target of discriminability reproducing processing.

In step S408, the CPU 120 determines whether a density difference of each color component between a rendering color (a color value before the color conversion) of the immediately preceding object and a rendering color (a color value before the color conversion) of the currently obtained object is smaller than a threshold. When the density difference of each color component between the objects is smaller than the threshold, the processing proceeds to step S409. Otherwise, the processing proceeds to step S412. This is because an object with the density difference from the immediately preceding object not smaller than the threshold is the discriminability reproducing processing target object, that is, not to be excluded from the target of discriminability reproducing processing.

In step S409, the CPU 120 determines whether the current object with the density difference of each color component smaller than the threshold has the same color as the immediately preceding object (whether all the corresponding color components are of the same value). When the objects are not determined to have the same color, the processing proceeds to step S410 where the same color flag is turned off, and then the processing proceeds to step S406. Thus, when the immediately preceding object and the current object are single color graphics that are adjacent to each other and have different but similar colors, the current object is determined to be a candidate of the non-discriminability reproducing processing target. When the objects are determined to have the same color in step S409, the processing proceeds to step S406, without turning off the same color flag, to spool the currently obtained object, and then the processing proceeds to step S401.

Thus, the processing proceeds to step S411 where the CPU 120 determines whether there is a spooled object, when there is no object to be read in step S401, or when the object does not satisfy the condition in step S403, that is, when the object is not a single color graphic having a width and height smaller than the threshold. When it is determined that there is a spooled object in step S411, the processing proceeds to step S412. When there is no spooled object, this processing is terminated. In step S412, the CPU 120 determines whether the number of spooled objects is not smaller than a threshold. When the number is determined to be smaller than the threshold, such an object is to be the discriminability reproducing processing target. Thus, the processing skips steps S413 and S414 and proceeds to step S415 where the spooled objects are flushed (saved). Then, the processing is terminated.

On the other hand, when the number of spooled objects is not smaller than the threshold in step S412, the processing proceeds to step S413, where whether the same color flag is off is determined. The same color flag being off indicates that the spooled objects form single color graphics that are adjacent to each other and have different but similar colors. A group of such objects is desirably excluded from the target of discriminability reproducing processing. Thus, the processing proceeds to step S414, where the spooled objects are provided with a flag indicating the non-discriminability reproduction target. Then, the processing proceeds to step S415 where the spooled objects are flushed, and then the processing is terminated.

The same color flag being on in step S413 indicates that the spooled objects all have the same color, and thus are a group of single color graphics. Such a group of objects is to be the discriminability reproducing processing target. Thus, the processing proceeds to step S415, without performing any processing on the spooled objects, where the objects are flushed, and the processing is terminated.

With this processing, when the overlap with the immediately preceding object is not smaller than the threshold, the density difference from the immediately preceding object is not smaller than the threshold, or when the number of objects is smaller than the threshold, the objects can be the discriminability reproducing processing target. Furthermore, when these objects have the same color, the objects can be the discriminability reproducing processing target for improving the discriminability.

On the other hand, when the overlap with the immediately preceding object is smaller than the threshold, when the density difference from the immediately preceding object is smaller than the threshold, the number of objects is not smaller than the threshold, and when the objects do not have the same color, the objects can be excluded from the target of discriminability reproducing processing.

FIG. 5 is a flowchart for describing processing of generating intermediate data in step S302 in FIG. 3.

First of all, in step S501, the CPU 120 functions as the page analyzing module 203 to obtain an object from the rendering commands. Next, the processing proceeds to step S502, and the CPU 120 determines whether the obtained object is text or graphic. When the object is text or graphic, the processing proceeds to step S503. When the object is something other than text or graphic, for example, the objects has gradation of a photograph and the like for example, the processing proceeds to step S506, without executing the discriminability reproducing processing. When the object is graphic, the CPU 120 determines whether the object is a single color graphic in step S503. When the object is a single color graphic, the processing proceeds to step S504. When the object is something (such as gradation) other than a single color graphic, the processing proceeds to step S506, without performing the discriminability reproducing processing.

In step S504, the CPU 120 functions as the page analyzing module 203 to determine whether the object is provided with the flag indicating the non-discriminability reproduction target provided in step S414 in FIG. 4B as described above. When the flag indicating the non-discriminability reproduction target is not provided, the processing proceeds to step S505 where the discriminability reproducing processing is performed. On the other hand, when the flag indicating the non-discriminability reproduction target is provided, the processing skips the discriminability reproducing processing in step S505, and proceeds to step S506. In step S505, the CPU 120 functions as the color information analyzing module 212 to execute the discriminability reproducing processing on the target text and graphics. Then, the processing proceeds to step S506. Details of the discriminability reproducing processing will be described later with reference to FIG. 6A. In step S506, the CPU 120 functions as the page analyzing module 203 to convert the rendering commands into intermediate data. Specifically, the rendering commands expressed using relative coordinates and Bezier curve and registered characters (font) are converted into a path point sequence of absolute coordinates conforming to the actual output resolution and paper size.

Thus, no discriminability reproducing processing is performed on an object other than text or graphic, or an object that is not a graphic filled with single color. On the other hand, a single color graphic object that is text or graphic not provided with the flag indicating the non-discriminability reproduction target is the discriminability reproducing processing target.

Figures 6A, 6B:
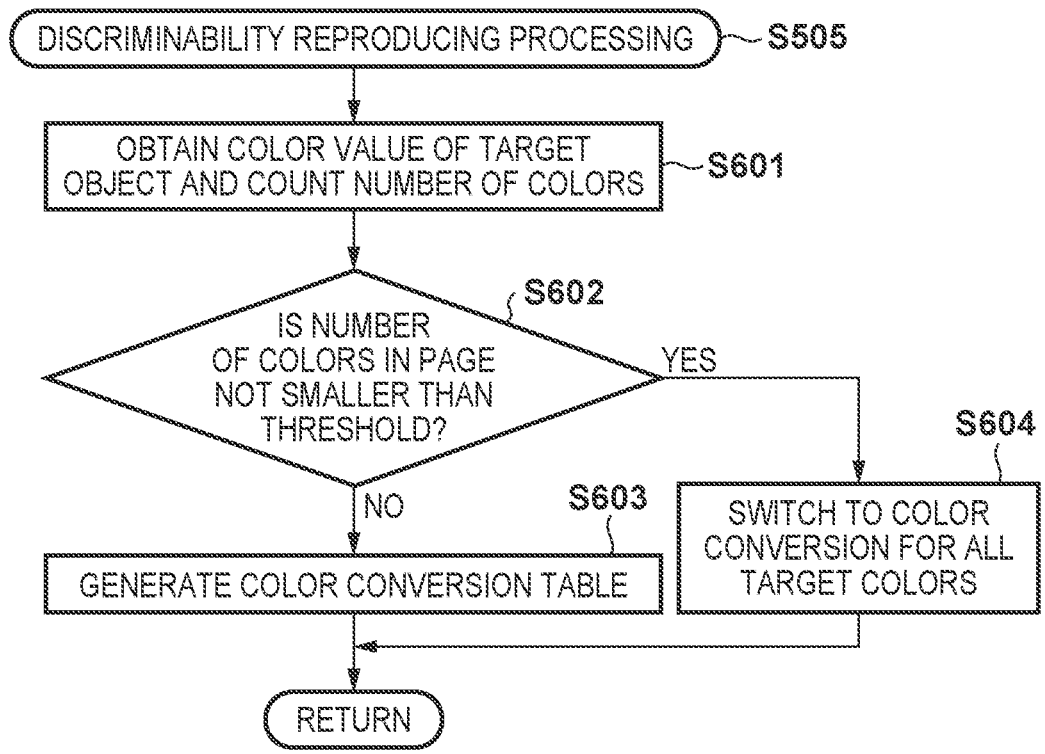
FIG. 6A is a flowchart for describing discriminability reproducing processing in step S505 in FIG. 5.
FIG. 6B is a diagram for describing an example of a color conversion table according to an embodiment.

FIG. 6A is a flowchart for describing discriminability reproducing processing in step S505 in FIG. 5. FIG. 6B is a diagram illustrating a specific example of gray conversion.

First of all, in step S601, the CPU 120 functions as the color information analyzing module 212 to obtain information on a rendering color from the object read by the page analyzing module 203, and count the number of colors used. When the color value at this point corresponds to the color already used for the target object in the page, the number of colors is not incremented. Next, the processing proceeds to step S602, and the CPU 120 determines whether the number of colors used for the target object in the page is not smaller than a predetermined threshold (not smaller than a predetermined value). More specifically, it is determined whether color data can be converted into gray data with a density difference rendering it visible, that is, whether the total number of colors exceeds the gradation number of the gray data that can be expressed with the printer unit 111, or the like. When the number of colors used in the page is determined to be smaller than the predetermined threshold, the processing proceeds to step S603, and the CPU 120 executes processing of generating a color conversion table for color data to achieve a density difference. Then, this processing is terminated. This color conversion table is a table for performing the color conversion in accordance with a predetermined color conversion scheme, and is here a table storing, in association, a color value of each color used in the page and a color value for converting the color value into a gray value with a visible density difference. As illustrated in FIG. 6B, for example, this color conversion table stores, in association, the color value before the conversion and the color value after the conversion. Such a color conversion table is described in, for example, Japanese Patent Laid-Open No. 2020-49939 and Japanese Patent Laid-Open No. 2017-38242 described above, and the like. The gray color value after the conversion corresponding to the color value of the color before the conversion in the color conversion table is determined, in accordance with the number of colors in a page and a possible range of the gray color value after the conversion. For example, when the number of colors in the page is three, and the gray color values after the conversion are in a range from 0 to 255, the gray color values are determined with an interval "51" as illustrated in FIG. 6B. On the other hand, when the number of colors used in the page is determined to be not smaller than the predetermined value in step S602, the processing proceeds to step S604, and the CPU 120 switches the processing to execute color conversion for all target colors on all the objects, without generating the color conversion table. Then, this processing is terminated.

Thus, the color conversion using the color conversion table is executed on a discriminability reproducing processing target object, whereby color data on the object can be converted into gray data with improved discriminability. When the number of colors in the page is not smaller than the threshold, the conversion using the color conversion table cannot be performed, and thus the processing is switched to execute the color conversion for all target colors.

FIG. 7 is a flowchart for describing image forming processing in step S303 in FIG. 3.

In step S701, the CPU 120 obtains intermediate data. Next, the processing proceeds to step S702, and the CPU 120 determines whether the color conversion table exists. When it is determined that the color conversion table exists, the location of the color conversion table is obtained, and the processing proceeds to step S703. On the other hand, when the color conversion table is determined not to exist, the processing proceeds to step S706, and grayscale conversion is performed through color conversion for all target colors on all the objects. Then, the processing proceeds to step S707, and the CPU 120 functions as the image forming module 204 to perform image forming processing of performing conversion into a raster format image formed from the intermediate data converting into a grayscale in accordance with the output resolution and the paper size. Then, this processing is terminated.

In step S703, the CPU 120 obtains the color conversion table based on the location of the color conversion table obtained in step S702. Next, the processing proceeds to step S704, and the CPU 120 determines whether the object for which the color conversion is performed is a target object of the discriminability reproducing processing using the color conversion table. When the object is determined to be the discriminability reproducing processing target, the processing proceeds to step S705, and color conversion is executed with a certain color as a target, to reproduce the discriminability with a density difference provided to the certain color, using the color conversion table. Then, the processing proceeds to step S707. On the other hand, when the object is determined to be excluded from the target of discriminability reproducing processing in step S704, the processing proceeds to step S706, and grayscale conversion is performed through color conversion for all target colors. Then, the processing proceeds to step S707.

The processing described above is image forming processing performed by the image forming module 204 notified of the intermediate data for a single page and the color conversion method, and is executed by the RIP 131 and the image editing unit 132 under an instruction from the page analyzing module 203 executed by the CPU 120.

Through the processing, reproducing processing for reproduction with improved discriminability through density adjustment can include determining whether continuous graphics are graphics to be a discriminability reproducing processing target, and switching whether to execute the discriminability reproducing processing on the graphics. Thus, continuous graphics requiring no processing of improving discriminability can be excluded from the target of discriminability reproducing processing, whereby the appearance of the graphics can be prevented from being compromised. On the other hand, it is possible to improve the discriminability of the gray image including the graphics for which the discriminability is required to be improved.

Specifically, when the objects are single color graphics that are adjacent to each other and have different but similar colors, the adjacent graphics can be excluded from the target of discriminability reproducing processing, whereby the appearance of the graphics can be prevented from being compromised.

Second Embodiment

A second embodiment of the present invention is described below with reference to the drawings. In the first embodiment described above, the processing is performed to make a determination in the order of objects in a page. In the second embodiment on the other hand, in reproducing processing with improved discriminability through density adjustment, graphics appearing in a random order can be determined to be graphics that are a discriminability reproducing processing target or not. Then, based on the determination, whether the discriminability reproducing processing is executed on the graphics or not executed is switched. The hardware configurations and the like of the printing system and the image processing apparatus 110 according to the second embodiment are the same as those in the first embodiment described above, and thus a description thereof will be omitted. Points different from the first embodiment are described below.

Figure 8A:
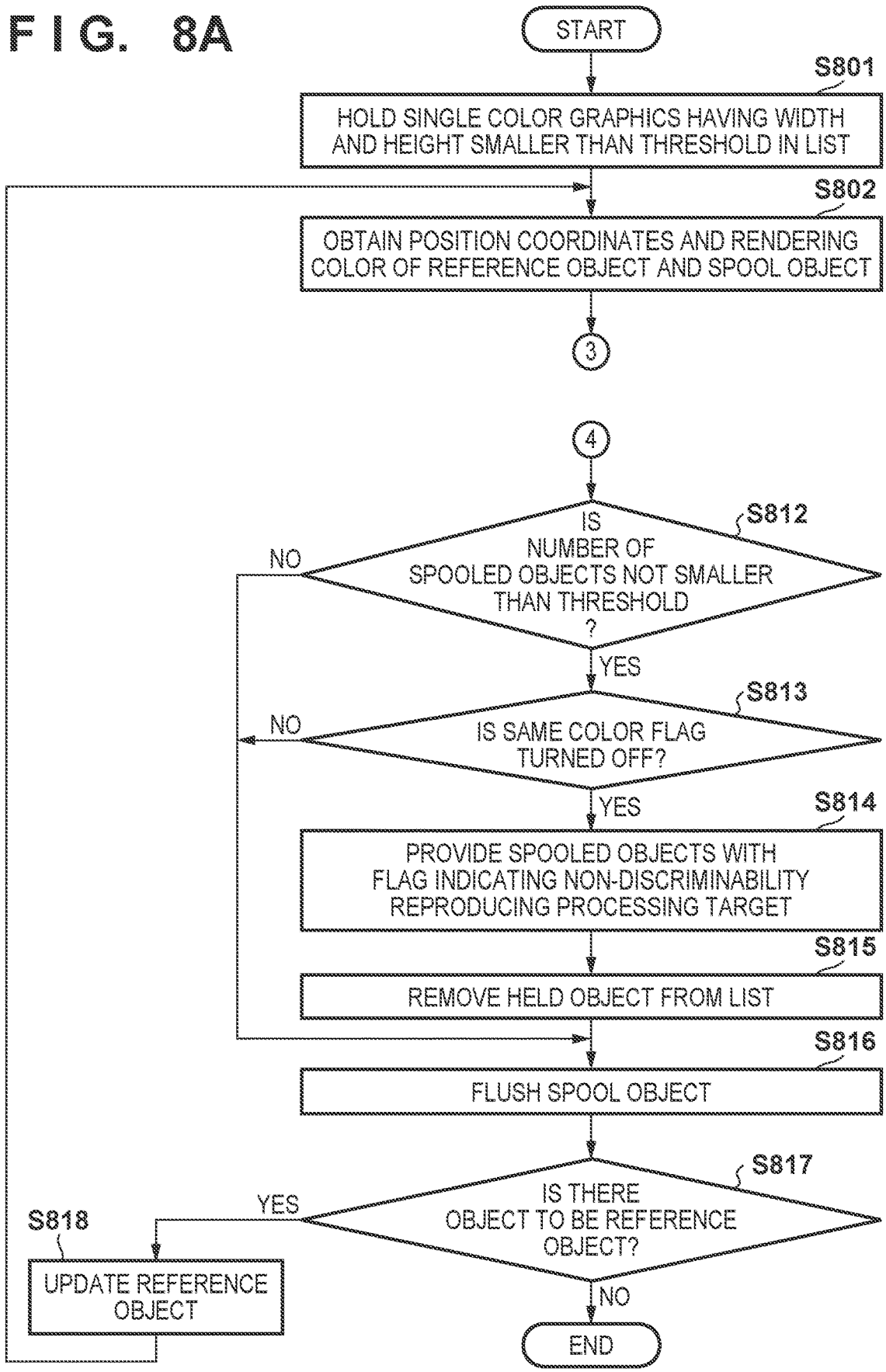
FIGS. 8A and 8B are flowcharts for describing processing of determining whether an object is to be a discriminability reproduction target in an image processing apparatus according to a second embodiment.
Figure 8B:
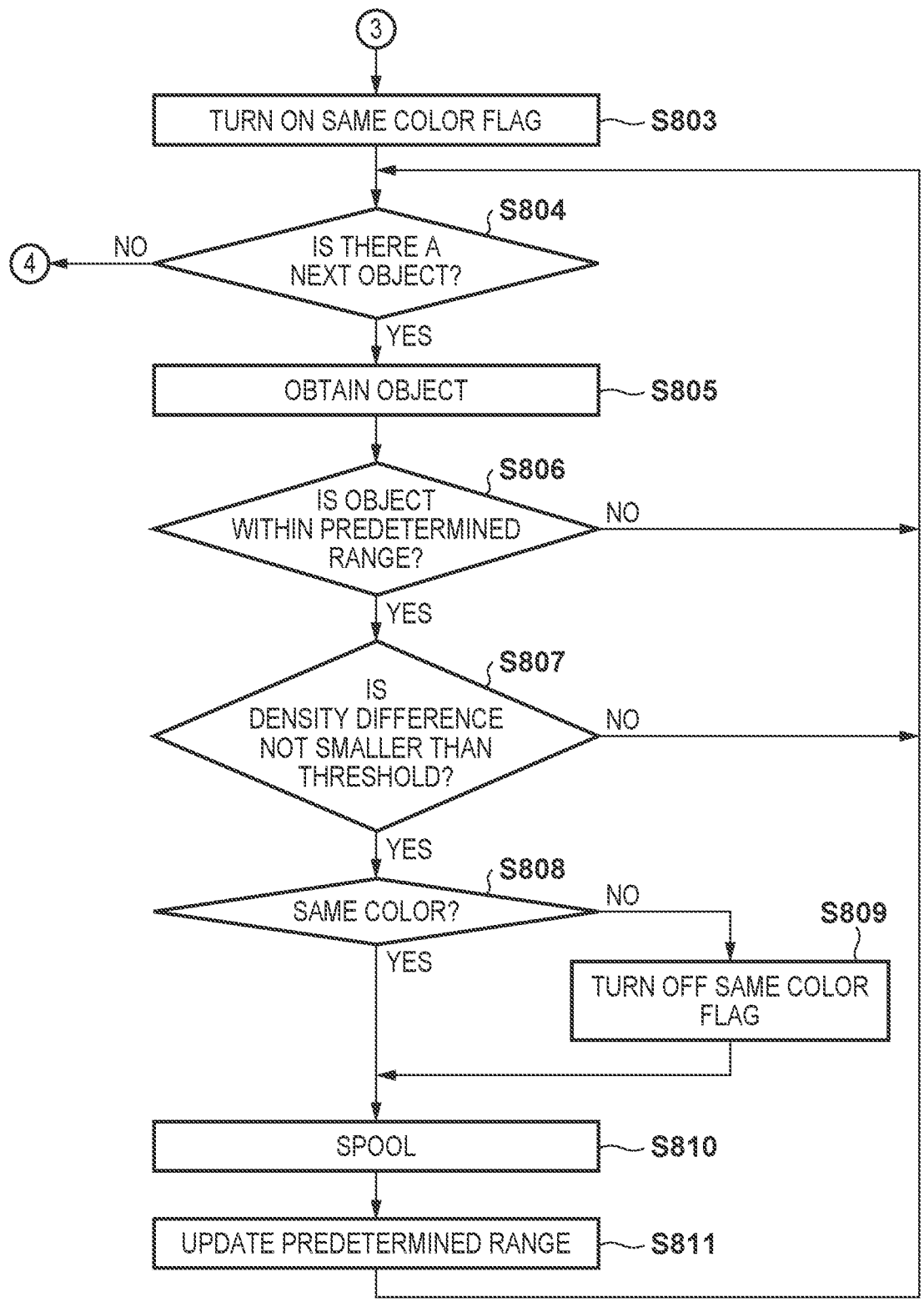

FIGS. 8A and 8B are flowcharts for describing processing of determining whether an object is to be a discriminability reproduction target in the image processing apparatus 110 according to the second embodiment.

FIGS. 9A-9E are diagrams illustrating examples of processing of updating a predetermined range in the processing of determining whether an object is the discriminability reproduction target in the second embodiment.

In the second embodiment, a method that corresponds to the processing of providing a flag indicating the non-discriminability reproducing processing target, and is different from the method described with reference to FIGS. 4A and 4B in the first embodiment will be described. In the second embodiment, processing, implemented by the CPU 120 functioning as the color information obtaining module 211 and the color information analyzing module 212, to determine whether single color graphics appearing in a random order are the single color graphics that are the discriminability reproducing processing target is described with reference to FIGS. 8A and 8B and FIG. 9A to FIG. 9E.

First of all, in step S801, the CPU 120 adds and holds all single color graphics having a width and height smaller than a threshold in a list in advance. Processing from step S802 is performed in the order of the objects held in the list. In step S802, the CPU 120 obtains the position coordinates and rendering color of a reference object, and spools the object. The first object in the list is first determined as the reference object. Then, the processing proceeds to step S803, and the CPU 120 turns on the same color flag to determine whether objects to be spooled all have the same color.

Next, the processing proceeds to step S804, and the CPU 120 determines whether there is a next object. When there is the next object, the processing proceeds to step S805 to obtain the object, and then the processing proceeds to step S806. When there is no next object, the processing proceeds to step S812. In step S806, the CPU 120 determines whether the next object obtained in step S805 exists within a predetermined range from the first reference object. When the object is determined to exist within the predetermined range, the processing proceeds to step S807. When the object is outside the predetermined range, the object is not the target of the processing of determining whether the object is the target of the discriminability reproducing processing, and thus the processing proceeds to step S804. In step S807, the CPU 120 determines whether a difference of each color component (density difference) between a rendering color (a color value before the color conversion) of the reference object and a rendering color (a color value before the color conversion) of the next object obtained is smaller than a threshold. When the density difference of each color component is smaller than the threshold, the processing proceeds to step S808. Otherwise, the object is not the target of the determination processing, and thus the processing proceeds to step S804. In step S808, the CPU 120 determines whether the rendering colors of the reference object and the next object are the same (all the color components have the same value). When the colors are not the same, the object is the non-discriminability reproduction target, and thus the same color flag turned off in step S809 and the processing proceeds to step S810. When the colors are the same, the processing proceeds to step S810, and the object is spooled. Then, the processing proceeds to step S811. In step S811, the CPU 120 updates the predetermined range, and the processing proceeds to step S804.

Thus, when the current object and the next object are found to be single color graphics existing within the predetermined range and having different but similar colors, the objects can be candidates of the non-discriminability reproducing processing target.

Here, a specific example of determining the predetermined range in step S811 will be described with reference to FIG. 9A to FIG. 9E.

Figure 9A:
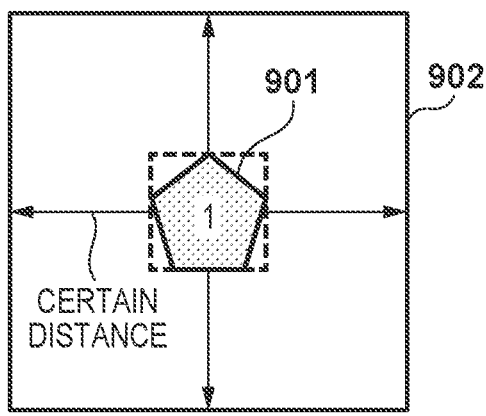
FIG. 9A to FIG. 9E are diagrams for describing examples of processing of updating a predetermined range in the processing of determining whether an object is the discriminability reproduction target in the second embodiment.

FIG. 9A depicts a view illustrating a case where only one reference object 901 is spooled. A minimum rectangle surrounding the reference object 901 is obtained, and a range of a certain distance from the rectangle is determined as a predetermined range 902.

Figure 9B:
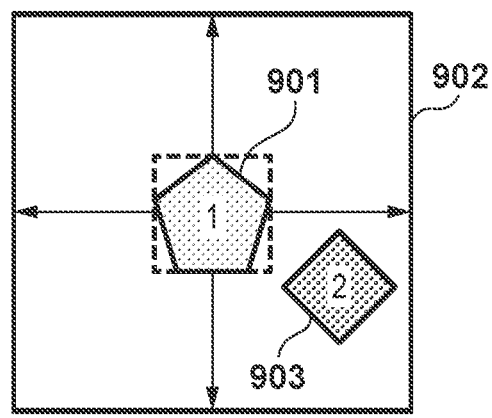
Figure 9C:
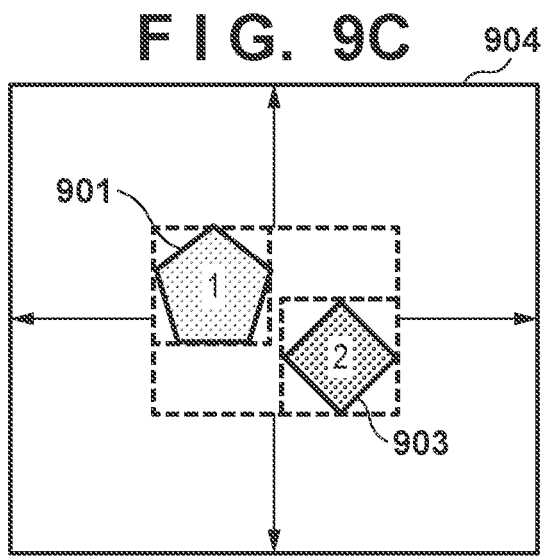
Figure 9D:
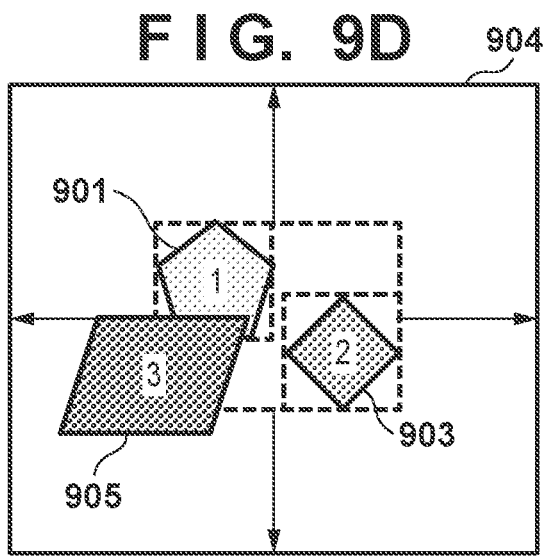
Figure 9E:
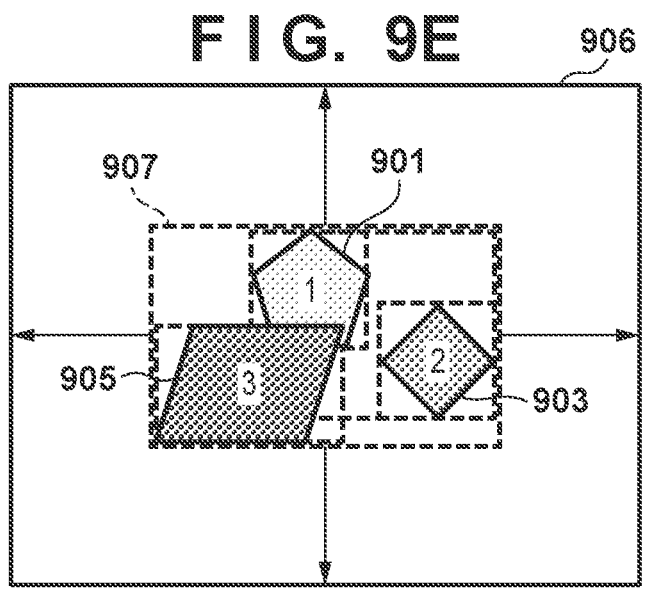

FIG. 9B depicts a view illustrating a case where a comparative object (next object) 903 is found that exists in the predetermined range 902 and satisfies the spool condition of the density difference being smaller than the threshold. In this case, as illustrated in FIG. 9C, a minimum rectangle surrounding the reference object 901 and the comparative object 903 is obtained, and the range is updated to a new predetermined range 904 at a certain distance from the minimum rectangle. Similarly, FIG. 9D depicts a view illustrating a case where a comparative object 905 is found that exists in the predetermined range 904 and satisfies the spool condition of the density difference being smaller than the threshold. In this case, as illustrated in FIG. 9E, a minimum rectangle 907 surrounding the reference object 901, the comparative object 903, and the comparative object 905 is obtained, and the range is updated to a new predetermined range 906 at a certain distance from the minimum rectangle 907.

In this manner, when the predetermined range is updated in step S811, the processing proceeds to step S804 to process the next object. With the processing in step S805 to step S811 thus repeatedly executed on the objects in the list, single color graphics having a short distance from each other and similar colors are detected.

When the comparison between the current reference object and the objects in the list is completed, the processing proceeds to step S812, and the CPU 120 determines whether the number of objects that satisfy the spool condition is not smaller than the threshold. When the number is determined to be smaller than the threshold, the processing proceeds to step S816 to perform the discriminability reproducing processing, and the objects spooled are flushed. Then, the processing proceeds to step S817. This is for, when the number of objects is smaller than the threshold, not performing the determination on whether the objects are to be excluded from the target of discriminability reproducing processing, because the image is not largely deteriorated even when the discriminability reproducing processing is executed on the objects.

On the other hand, when the number of objects is not smaller than the threshold, the processing proceeds to step S813, and the CPU 120 determines whether the same color flag is off. When the same color flag is determined to be off, the objects spooled form single color graphics existing within a certain distance and having different but similar colors. Thus, in this case, such a group of objects is desirably excluded from the target of discriminability reproducing processing, and thus the processing proceeds to step S814. In step S814, the CPU 120 provides the spooled objects with the flag indicating the non-discriminability reproduction target. Then, the processing proceeds to step S815, and the CPU 120 removes the objects provided with the flag from the list and the processing proceeds to step S816, to flush the spooled objects. Then, the processing proceeds to step S817.

On the other hand, when the CPU 120 determines that the same color flag is on in step S813, it indicates that the objects spooled all have the same color, and thus are a group of single color graphics. The group of objects are to be the discriminability reproducing processing target, and thus the processing skips step S814 and step S815, to proceed to step S816 to flush the spooled objects, without processing the objects spooled.

Then, the processing proceeds to step S817, and the CPU 120 removes the current reference object from the list if such a current object remains in the list. The processing proceeds to step S818 when an object still exists in the list. In step S818, the CPU 120 updates such an object to be the reference object. When the object is thus updated, the processing proceeds to step S802, and whether the object is formed by single color graphics that are concentrated within the certain distance and have different but similar colors is determined as described above. When the CPU 120 determines that there is no object to be the new reference object in the list in step S817, this processing is terminated.

As described above, even when adjacent graphics with similar colors are configured as discontinuous commands or even when adjacent graphics with similar colors do not overlap, the graphics are detected as adjacent graphics with similar colors and whether they are the target of the discriminability reproducing processing can be determined, as long as the graphics are within the certain distance.

When the graphics are configured as discontinuous commands, the determination processing may be executed with the graphics sorted based on the position information on each of the graphics. The value of the certain distance may be changed as appropriate.

With the second embodiment as described above, in reproducing processing with improved discriminability through density adjustment, graphics appearing in a random order can be determined to be graphics that are a discriminability reproducing processing target or not. Thus, whether the discriminability reproducing processing is executed or not executed can be switched in accordance with the graphics. With this configuration, graphics requiring no processing of improving the discriminability are excluded from the target of discriminability reproducing processing, whereby the appearance of a gray image including the graphics can be prevented from being compromised. Furthermore, discriminability of graphics requiring the processing of improving the discriminability is improved, whereby reproducibility can be improved.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-109415, filed Jun. 30, 2021, which is hereby incorporated by reference herein in its entirety.

What is claimed is:

1. An image processing apparatus for converting color data into gray data, the image processing apparatus comprising:

one or more processors and one or more memories being configured to:
extract an object included in the color data in a page;
determine, based on color information and position information on a first object and a second object extracted, whether at least one of the first object and the second object is to be a target of conversion of a color value of the color data into a gray value with improved discriminability; and
control to convert, based on the determining, the color value of the object into a gray value by a conversion targeting all color values, or into a gray value with the improved discriminability.

2. The image processing apparatus according to claim 1, wherein, in the determining, it is determined to convert the color values of the first object and the second object into the gray value by the conversion targeting all color values, in a case where a distance between the first object and the second object extracted is smaller than a first threshold and a density difference between the first object and the second object is smaller than a second threshold, and in a case where the first object and the second object have different colors.

3. The image processing apparatus according to claim 1, wherein, in the determining, it is determined to convert the color values of the first object and the second object into the gray value with the improved discriminability, in a case where a distance between the first object and the second object extracted is not smaller than a first threshold or a density difference between the first object and the second object is not smaller than a second threshold and the first object and the second object have a same color.

4. The image processing apparatus according to claim 1, wherein, in the determining, it is determined to exclude an object other than text or graphic from a target of the conversion into a gray value with the improved discriminability.

5. The image processing apparatus according to claim 1, wherein, in the determining, it is determined to exclude an object other than a graphic filled with single color from a target of the conversion into a gray value with the improved discriminability.

6. The image processing apparatus according to claim 1, wherein, in the determining, it is determined to convert the object extracted into the gray value by the conversion targeting all the color values, in a case where a number of colors included in the color data is not smaller than a predetermined value.

7. The image processing apparatus according to claim 1, wherein the determining is performed in an order of objects in the page.

8. The image processing apparatus according to claim 1, wherein, in the determining, it is determined that an object, among objects that are each a single color graphic having a width and height in the page being smaller than a threshold, forming single color graphics that exist within a predetermined range of a certain distance and have different but similar colors, is excluded from a target of the conversion into a gray value with the improved discriminability.

9. The image processing apparatus according to claim 8, wherein the one or more processors and the one or more memories being further configured to:
update, in a case where a first object to be a reference and a second object forming single color graphics having different but similar colors exist, the predetermined range to a range at a certain distance from a minimum rectangle surrounding the first object and the second object.

10. The image processing apparatus according to claim 1, wherein the object is a single color graphic having a width and height smaller than a predetermined value.

11. The image processing apparatus according to claim 1, wherein, in the conversion to a gray value with the improved discriminability, the one or more processors and the one or more memories are configured to:
generate a color conversion table conforming to a predetermined color conversion scheme in accordance with number of colors used in the page; and
convert, based on the color conversion table, color values of respective colors of intermediate data of the color data in the page into gray values with a density difference.

12. The image processing apparatus according to claim 1, wherein the conversion targeting all color values is a conversion scheme with which all the color values are converted under a same rule.

13. An image processing apparatus for converting color data into gray data, the image processing apparatus comprising:
one or more processors and one or more memories being configured to:
convert a plurality of color values of the color data respectively into gray values different from each other by a predetermined value or more;
convert color values of the color data into gray values based on a predetermined formula;
identify a first graphic object and a second graphic object that are adjacent to each other in a page with a density difference between the first graphic object and the second graphic object being smaller than a threshold, and have different colors; and
for the first graphic object and the second graphic object identified, perform the conversion into the gray values based on the predetermined formula, without performing the conversion into the gray values different from each other by the predetermined value or more.

14. A method of controlling an image processing apparatus for converting color data into gray data, the method comprising:
converting a color value of the color data into a gray value with improved discriminability;
converting a color value of the color data into a gray value by a conversion targeting all color values;
extracting an object included in the color data in a page;
determining, based on color information and position information on a first object and a second object extracted, whether at least one of the first object and the second object is to be a target of conversion into a gray value with improved discriminability; and
converting, based on the determining, the color value of the object into a gray value by a conversion targeting all color values, or a conversion into a gray value with the improved discriminability.

15. A method of controlling an image processing apparatus for converting color data into gray data, the method comprising:
converting a plurality of color values of the color data respectively into gray values different from each other by a predetermined value or more;
converting color values of the color data into gray value based on a predetermined formula;
identifying a first graphic object and a second graphic object that are adjacent to each other in a page with a density difference between the first graphic object and the second graphic object being smaller than a threshold, and have different colors; and for the first graphic object and the second graphic object identified, performing the conversion into the gray values based on the predetermined formula, without performing the conversion into the gray values different from each other by the predetermined value or more.

16. A non-transitory computer-readable storage medium storing a program for causing a processor to execute a method of controlling an image processing apparatus for converting color data into gray data, the method comprising:

converting a color value of the color data into a gray value with improved discriminability;

converting a color value of the color data into a gray value by a conversion targeting all color values;

extracting an object included in the color data in a page;

determining, based on color information and position information on a first object and a second object extracted, whether at least one of the first object and the second object is to be a target of conversion into a gray value with improved discriminability; and converting, based on the determining, the color value of the object into a gray value by a conversion targeting all color values, or a conversion into a gray value with the improved discriminability.

17. A non-transitory computer-readable storage medium storing a program for causing a processor to execute a method of controlling an image processing apparatus for converting color data into gray data, the method comprising:

converting a plurality of color values of the color data respectively into gray values different from each other by a predetermined value or more;

converting color values of the color data into gray value based on a predetermined formula;

identifying a first graphic object and a second graphic object that are adjacent to each other in a page with a density difference between the first graphic object and the second graphic object being smaller than a threshold, and have different colors; and for the first graphic object and the second graphic object identified, performing the conversion into the gray values based on the predetermined formula, without performing the conversion into the gray values different from each other by the predetermined value or more.

\* \* \* \* \*